United States Patent [19]

Hadaway

[11] 4,085,621
[45] Apr. 25, 1978

[54] TRAVERSING MECHANISM

[75] Inventor: Bernard Milton Hadaway, Melbourne, Australia

[73] Assignee: Repco Research Proprietary Limited, Dandenong, Australia

[21] Appl. No.: 708,355

[22] Filed: Jul. 26, 1976

[30] Foreign Application Priority Data

Aug. 4, 1975  Australia .............. 2626/75

[51] Int. Cl.² .......................................... F16H 19/06
[52] U.S. Cl. .......................................................... 74/37
[58] Field of Search ............................................... 74/37

[56] References Cited

U.S. PATENT DOCUMENTS

| 1,774,356 | 8/1930 | Cloud | 74/37 |
| 2,517,546 | 8/1950 | Deakin | 74/37 |

FOREIGN PATENT DOCUMENTS

| 554,389 | 2/1957 | Belgium | 74/37 |

*Primary Examiner*—Benjamin W. Wyche
*Assistant Examiner*—Wesley S. Ratliff, Jr.
*Attorney, Agent, or Firm*—Stevens, Davis, Miller & Mosher

[57] ABSTRACT

Traversing mechanism for use in any type of machine in which part of the machine is required to reciprocate between two predetermined limits of travel. The mechanism includes a carriage which is attachable to that machine part, and an endless belt which, in operation, is continuously driven in one direction and has two parallel runs located on opposite sides of the carriage. A rotatable coupling wheel is mounted on the carriage and has an odd number of radially projecting lobes arranged around its periphery so that in one rotational position of the wheel one lobe engages one run of the belt, and in another rotational position of the wheel another lobe engages the other run of the belt. The arrangement is such that in each rotational position of the wheel there is only one lobe in full engagement with the belt. Stops are provided at the extremities of the carriage travel, and each time a stop is engaged the resulting interaction between the belt and the wheel causes the wheel to rotate to adopt a new position such that the drive imparted to the carriage alternates between the two belt runs. A sliding escapement is provided to restrain the wheel against inadvertant movement from an operative position, and that escapement is moved to release the wheel each time a stop is engaged.

6 Claims, 13 Drawing Figures

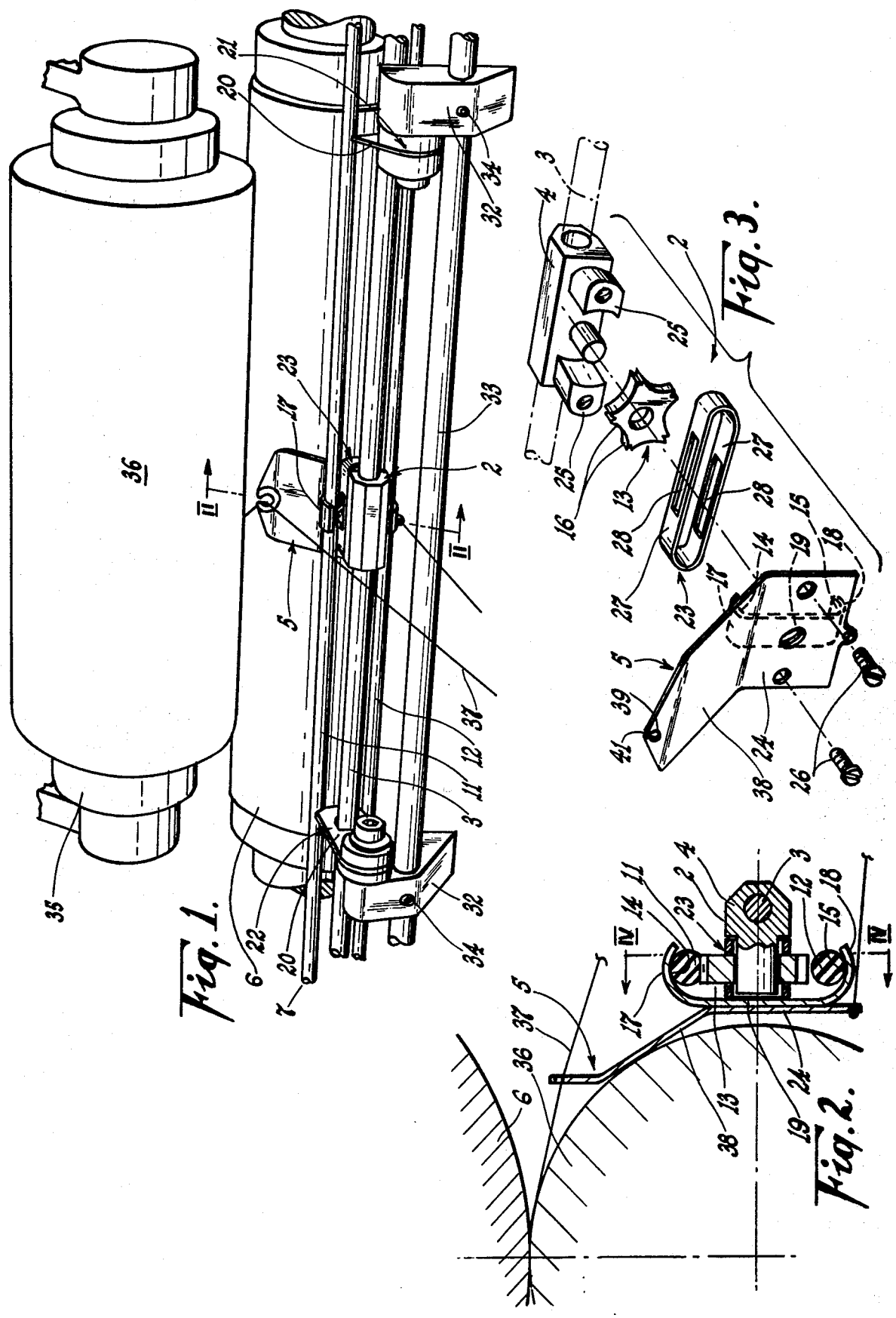

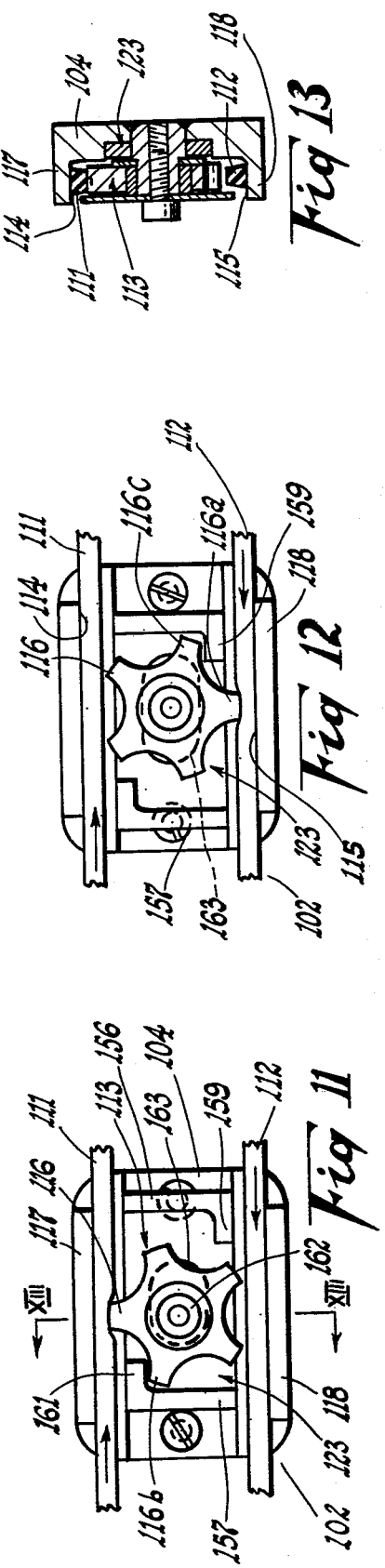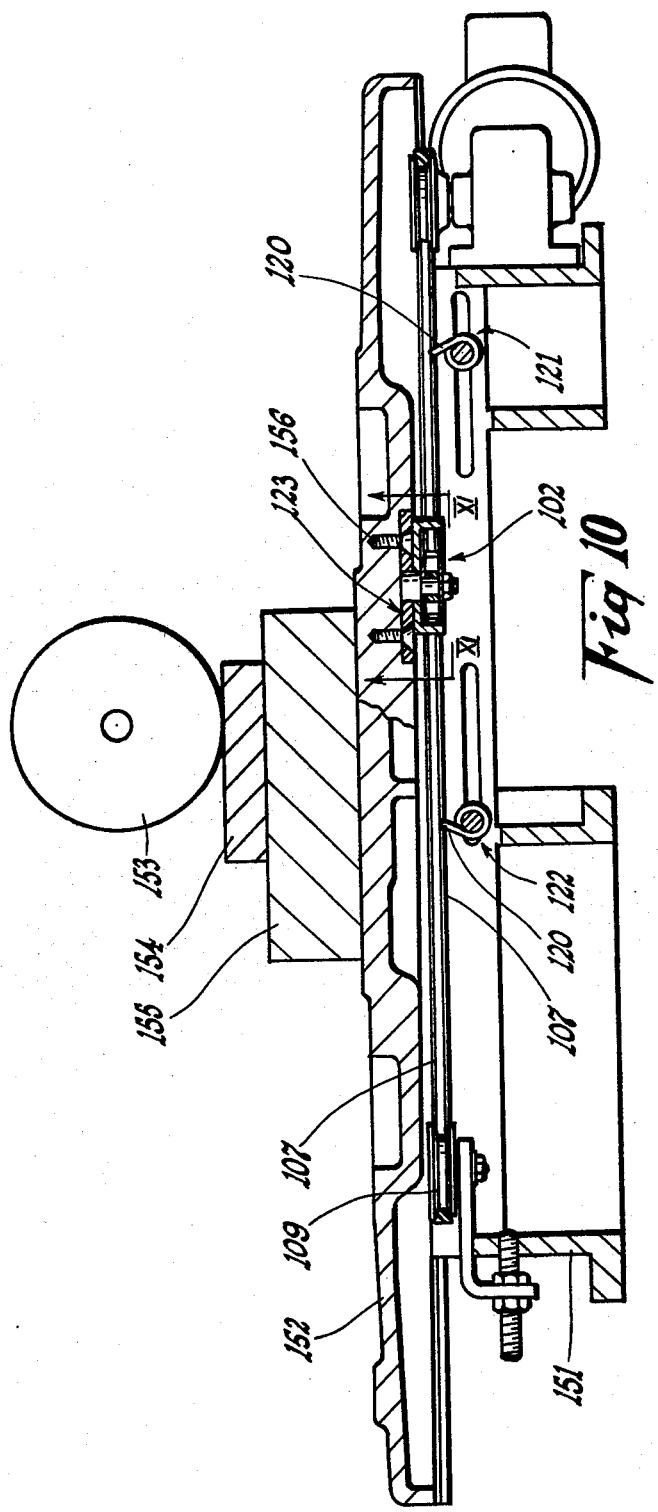

TRAVERSING MECHANISM

This invention relates to traversing mechanisms in general. Such mechanisms have many uses — e.g., controlling movement of a reciprocatable part of a machine tool, or controlling the winding of yarn and other filamentary materials such as wire, on to a package. It will be convenient to hereinafter describe the invention in relation to yarn winding and grinding machines, but the invention has many other applications.

There is a general need for uniform speed traversing mechanisms of relatively simple construction which can change direction quickly and which allows convenient adjustment of the traversing length. That need is especially felt in yarn winding because the speed at which the traversing mechanism changes direction influences the yarn package density, and particularly the end hardness. In yarn package density, and particularly the end position of direction changes during formation of a package so as to improve end security and guard against end hardness. Control of end hardness and package density in general, is extremely important for subsequent treatment such as yarn dying.

Traversing mechanism as commonly used in the textile industry includes scroll cams for controlling the traversing carriage, but such cams are relatively complex and do not permit a sufficiently rapid change in traversing direction. Furthermore, scroll cams do not lend themselves to convenient adjustment of traversing length, and especially cyclical adjustment of that length which is a desirable procedure in yarn winding.

Another application of the present invention is in relation to grinding machines of the kind in which a work support table is arranged to reciprocate beneath a grinding wheel. Traversing mechanisms as used in such machines are generally of a complex and expensive nature, and consequently the smaller type of such machine usually employs manual traversing which is laborious and inefficient because of the fact that the operator can seldom achieve a constant and continuous traversing speed over the range that the grinding wheel acts on the workpiece. Hydraulics are normally used in the traversing mechanism of the larger grinding machines, but that is costly as previously stated, and also imposes a high load on the machine at each change of traversing direction.

It is a primary object of the present invention to provide a traversing mechanism of relatively simple and inexpensive construction, and which includes improved means for achieving direction changes at a rapid rate. It is a further object of the invention to provide such a mechanism which is particularly adaptable for use in winding yarn and other filamentary material. It is yet another object of the invention to provide an improved yarn winding machine including the foregoing traversing mechanism.

Traversing mechanism according to the invention includes a carriage of a form appropriate for the particular use of the mechanism, guide means for controlling the path of movement of the carriage, drive means including an endless belt which is driven in one direction for both directions of movement of the carriage, and a drive coupling operative to attach the carriage to either of the two runs of the belt according to the desired direction of movement of the carriage. The belt runs are laterally spaced sections of the belt which extend substantially parallel to each other and which, during operation of the drive means, are moving in opposite directions. The carriage-to-belt attachment is preferably a frictional or clamping engagement which can be quickly engaged and released as will be hereinafter described in detail.

The path of movement of the carriage is usually straight, although there may be applications in which it is curved or otherwise arranged, and in that event the aforementioned belt runs may be similarly arranged. Thus, the reference to the parallel nature of the belt runs is to be understood as meaning that the two runs are regularly spaced over their length.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

FIG. 1 is a perspective view showing part of a yarn winding machine incorporating one embodiment of the invention.

FIG. 2 is a cross-sectional view taken along line II—II of FIG. 1, and shown on a larger scale.

FIG. 3 is an exploded view of part of the traversing mechanism shown in FIGS. 1 and 2.

FIG. 10 is a semi-diagrammatic sectional view of a grinding machine incorporating another embodiment of the invention.

FIG. 11 is a view taken in the direction of arrows XI—XI shown in FIG. 10.

FIG. 12 is a view similar to FIG. 11 but showing the mechanism being driven in the opposite direction and FIG. 13 is a cross-sectional view taken along line XIII—XIII of FIG. 11.

Figure 4:
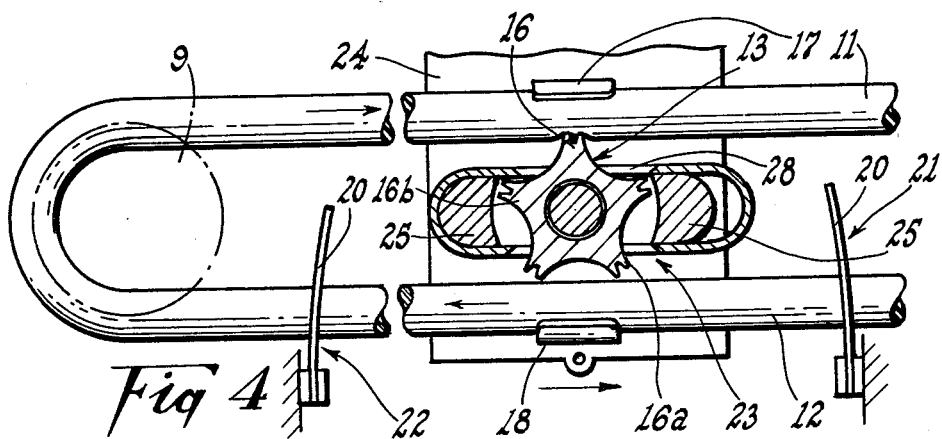
FIG. 4 is a semi-diagrammatic view showing the traversing mechanism of FIG. 1 operating to drive the yarn guide in one direction.

In the particular form of the invention shown in FIGS. 1 to 6 of the drawings, the carriage 2 is held in a straight path of movement by an elongate guide bar 3 on which the carriage body 4 is slidably mounted. That bar 3 may be of any cross sectional shape, but in the arrangement shown it is a circular rod so that it is necessary to hold the carriage 2 against rotation about the bar 3. In the construction shown in FIG. 1, which depicts part of a yarn winding machine, rotation of the carriage 2 is prevented by part of a yarn guide 5 slidably engaging a surface of a roller 6 of the machine. In an alternative construction not shown, resistance to rotation may be achieved by a secondary guide bar against parallel to the main guide rod and which is slidably engaged by an outrider of the carriage. The outrider may comprise a lateral arm and a slide block secured to the arm and engaging the secondary guide bar. The block could encompass the secondary guide bar, or it may simply rest against that bar and be held in engagement by any appropriate means.

Figure 9:
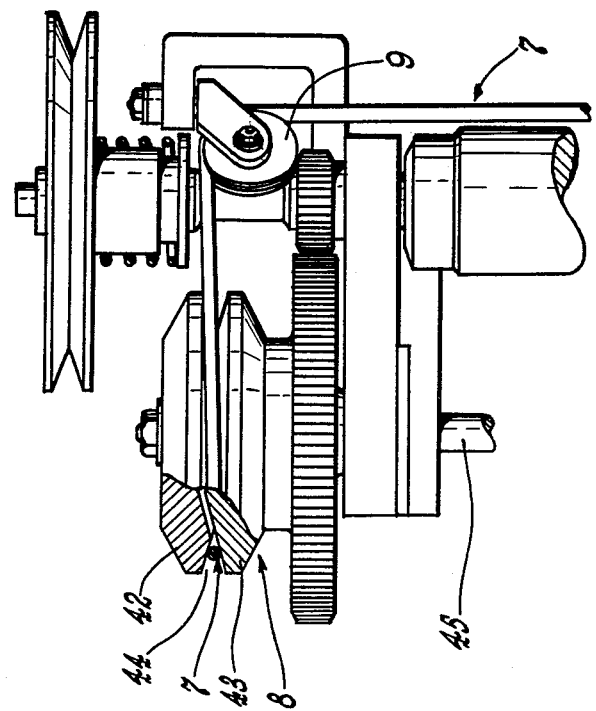
FIG. 9 is partially sectioned view of one form of drive arrangement for the belt as used in the arrangement of FIG. 1.

The endless belt 7 which drives the carriage 2 could be of any suitable form but it is preferred to use a circular cross-section, or some other cross-section providing a reasonable depth of the belt for a reason hereinafter made clear. A resilient material such as polyurethane or rubber is preferably used to form the belt 7. The belt 7 is mounted on a suitable drive pulley 8 (see FIG. 9) connected to a motor (not shown), and one or more idler pulleys 9 as required, so that two substantially parallel and laterally spaced runs 11 and 12 of appropriate length are arranged adjacent and substantially parallel to the guide rod 3. In the preferred arrangement shown, each run 11 and 12 is located adjacent a respective side of the guide rod 3, (see FIG. 1) but that is not essential.

A frictional clamp coupling is provided on the carriage 2, and that includes a rotatable element 13 located between the two belt runs 11 and 12, and backing surfaces 14 and 15 are respectively located on the outside of the runs 11 and 12. A section of each run 11 and 12 is thereby interposed between the rotatable element 13 and a respective one of the backing surfaces 14 and 15. The rotatable element 13 is mounted on the carriage body 4 for movement about an axis extending substantially normal to the plane containing the axes of the two belt runs 11 and 12 and which is located substantially midway between those axes (see FIG. 2). A plurality of radially projecting lobes 16 are provided on the rotatable element 13 at substantially regularly spaced intervals around the periphery, so that the element in effect forms a wheel having an interrupted peripheral surface. The peak of each lobe 16 lies on a circle co-axial with the wheel axis, and there are an odd number of lobes 16 (preferably five) for a reason hereinafter made clear.

The peripheral diameter of the wheel 13 is predetermined relative to the spacing between the two belt runs 11 and 12, the belt depth (diameter in the case of a circular belt), and the spacing between the two backing surfaces 14 and 15. The last mentioned spacing is preferably greater than the distance between the remote surfaces of the two belt runs 11 and 12, and it is preferred that substantially the same clearance (which need not be great) is provided between each belt run 11 and 12 and the adjacent backing surface 14 and 15 respectively. That is, when the belt run 12, for example, is not influenced by the coupling wheel 13 as hereinafter described, there is no clamping engagement between that run and the associated backing surface 15, and it is preferred that there is no engagement at all between those parts, although in practice light contact may occur if the belt run 12 is subjected to vibration. The periphery diameter of the wheel 13 is such that a lobe 16 cannot be rotated beyond a certain position without interfering with the adjacent belt section, and maximum interference occurs when the peak of the lobe 16 lies in a radial plane of the wheel 13 which is substantially transverse to the longitudinal axis of the adjacent belt section (see FIG. 4). At that maximum interference position shown in FIG. 4, and during a range of movement of the wheel 13 extending on both sides thereof, section of the belt run 11 is clamped between the lobe 16 and the adjacent backing surface 14 and the belt 7 will elastically distort to permit the lobe 16 to be moved through that range of movement.

It is required that the coupling wheel 13 is free of one run of the belt 7 while in clamping engagement with the other. The space between adjacent lobes 16 is dimensioned to achieve that end, and the use of an odd number of lobes 16 results in a space being located adjacent one belt run while a lobe 16 engages the other (again see FIG. 4).

Any suitable form of backing surface may be used, such as a roller having its axis of rotation substantially parallel to that of the wheel 13. It is preferred however, that each backing surface is formed as shown in FIGS. 1 to 7 by a respective portion 17 and 18 of a plate 19 secured to the carriage body 4 or formed integral therewith, and each portion 17 and 18 is curved to form a shallow channel which will retain its respective belt run 11 and 12 against substantial lateral movement away from the clamping position and defines the backing surface at its inner surface.

A construction as described can be used in any of several applications. In use, the drive belt 7 is moved continuously in one direction — i.e., the drive is either clockwise or anti-clockwise. By way of example, if a lobe 16 of the coupling wheel 13 is in clamping engagement with belt run 11 as shown in FIG. 4, the carriage 2 will move with that run until engaged by a stop 21 and thereby held against further movement with the engaged belt run 11 (see FIG. 5). As a result, the belt run 11 will move relative to the carriage 2 and thereby cause rotation of the coupling wheel 13 because of the engagement with that wheel. Such rotation will bring another lobe 16a of the wheel 13 into clamping engagement with the other run 12 while simultaneously freeing the previously engaged lobe 16 from its respective belt run 11, and consequently the carriage 2 is moved with the newly engaged run 12 in a direction opposite to that in which it previously moved (see FIG. 6). In that way, the carriage movement is continuously reversed without requiring reversal of the actual drive means — i.e., the drive belt 7. The time between release from one belt run and driving engagement with the other, may be quite small, and can be controlled to some extent by selection of the diameter of the coupling wheel 13 and the number of lobes 16 on that wheel. Obviously the length of traverse can be simply adjusted by suitable relative positioning of the carriage stops 21 and 22.

During the change of drive engagement from one belt run to the other, the coupling wheel 13 is rotated at a peripheral speed equivalent to the belt speed. That is, referring to FIG. 5, the lobe 16 being disengaged is travelling at the same speed as the belt 7 as it leaves its respective belt run 11, and the lobe 16a being engaged with the other belt run 12 is also travelling at that speed. In the result, there is no scuffling of the belt 7 so that maintenance is minimized, and the change-over is smooth.

The carriage stops 21 and 22 may be spring influenced, especially when the traversing mechanism is used in high speed applications. In that event there is minimum loss of energy at each reversal of the mechanism, and at high speeds in particular the motion of the carriage 2 at each reversal is, in effect, a simple harmonic motion.

Figure 5:
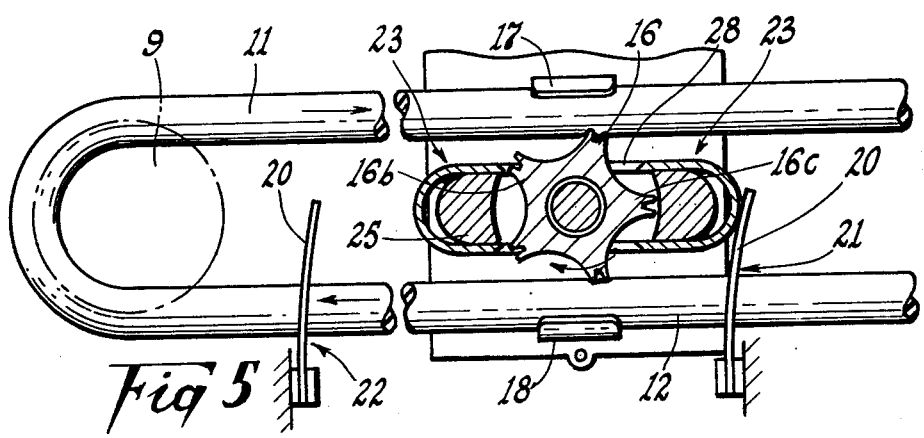
FIG. 5 is a view similar to FIG. 4 but showing the traversing mechanism in the course of a change of the coupling position as effected at the end of the mechanism travel in one direction.
Figure 6:
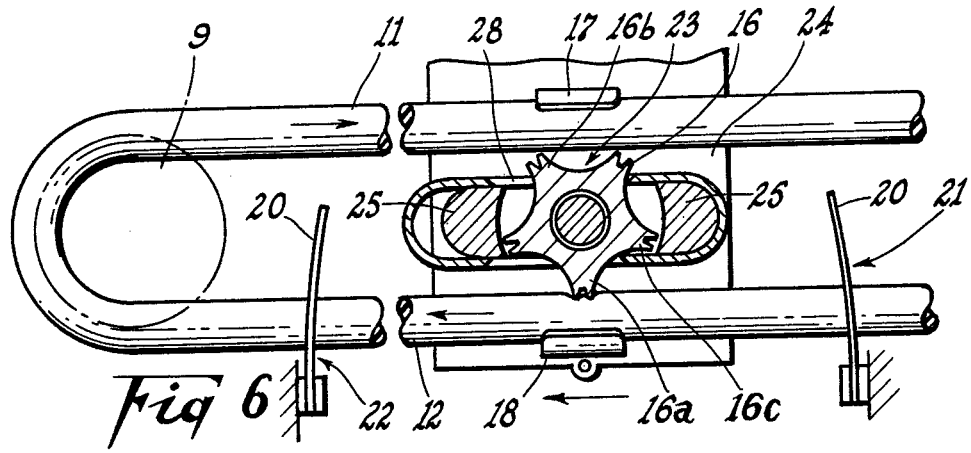
FIG. 6 shows the coupling after the change has been completed and the mechanism is being driven in the opposite direction to that shown in FIG. 4.

In the construction shown in FIGS. 1 to 7, the parts of the stops 21 and 22 which engages the carriage 2 (or a member secured thereto) is spring arm 20 (or similar resilient member) which "gives" with initial contact with the carriage 2 (see FIGS. 4 and 5). The arm 20 is thereby stressed to impart a driving force to the carriage 2 which acts in the direction that the carriage 2 is to travel as a result of the change-over. Preferably, the resilience of the arm 20 is predetermined so that the arm 20 commences to drive the carriage 2 in the new direction at substantially the same time as the new lug 16a arrives at its fully operative position as shown in FIG. 6. As a result, a particularly smooth change-over is achieved.

When the traversing mechanism is used in high speed applications such as yarn winding machinery, it may be desirable to employ means for retaining the coupling wheel 13 in its operative position during each traversing movement. An escapement may be used for that purpose, and in the form shown in the drawings, the escapement includes a member 23 slidably mounted on the carriage body 4 for movement between two operative positions, and in both of those positions it holds the coupling wheel 13 against rotation in the direction in which it is urged by its engagement with the drive belt 7. During movement from one of those positions to the other however, the wheel 13 is momentarily released from the influence of the escapement 23, and it is during that period of time that the change in drive direction is effected. That is, the escapement position is changed at each carriage stop 21 and 22, and that may be effected, as shown in FIGS. 4 to 6, by actual engagement with the stop, or engagement with an abutment associated therewith.

Any form of slidable escapement 23 can be employed, but in the construction so far described it is preferred to use a sleeve-like member 23 which is slidably mounted between opposed surfaces of the carriage body 4 and the plate 19 which forms the backing surfaces 14 and 15. In the arrangement shown, the plate 19 is secured to a mounting plate 24 which is formed integral with or carries the yarn guide 5. The plate 24 and carriage body 4 are held apart by two pillars 25 to which the plate 24 is secured by screws 26 (see FIG. 3), and the escapement 23 slides over both pillars 25 with a clearance in the direction of travel so that the pillars 25 limit the degree of the sliding movement of the escapement 23 relative to the carriage body 4 (see FIGS. 4 and 6). Each of the two opposite side walls 27 of the escapement sleeve 23 has an opening 28 through which a lobe 16 of the coupling wheel 13 can project to engage the drive belt 7 (see FIG. 3). The location and size of each opening 28 is such that at least one of the in-operative (non-clamping) lobes 16 engages some part of the escapement sleeve 23 to prevent rotation of the wheel 13 when the escapement 23 is in an operative position.

The foregoing operation of the escapement 23 can best be understood from a consideration of FIGS. 4 to 6 of the drawings. It will be seen that in the FIG. 4 position, the lobe 16b immediately trailing the operative lobe 16 cannot move a substantial distance in the direction of travel of belt run 11 because it will foul with an inside surface of the escapement sleeve 23, and in some circumstances it may actually bear against that inside surface. As a result rotation of the wheel 13 beyond, or substantially beyond, the maximum interference position is prevented. Also in that arrangement, engagement between the trailing lobe 16b and the escapement sleeve 23 serves to retain the sleeve 23 in its operative position thereby guarding against premature movement away from that position. It will be seen from FIG. 5 that engagement between the sleeve 23 and stop 21 causes movement of the sleeve 23 relative to the wheel 13 such that lobe 16b is able to pass through the adjacent opening 28 and the wheel 13 can rotate to a new operative position which is shown in FIG. 6. In the FIG. 6 position, another lobe 16c becomes the retaining lobe by being engageable with the inside of the sleeve side wall 27 adjacent the belt run 12.

Figure 7:
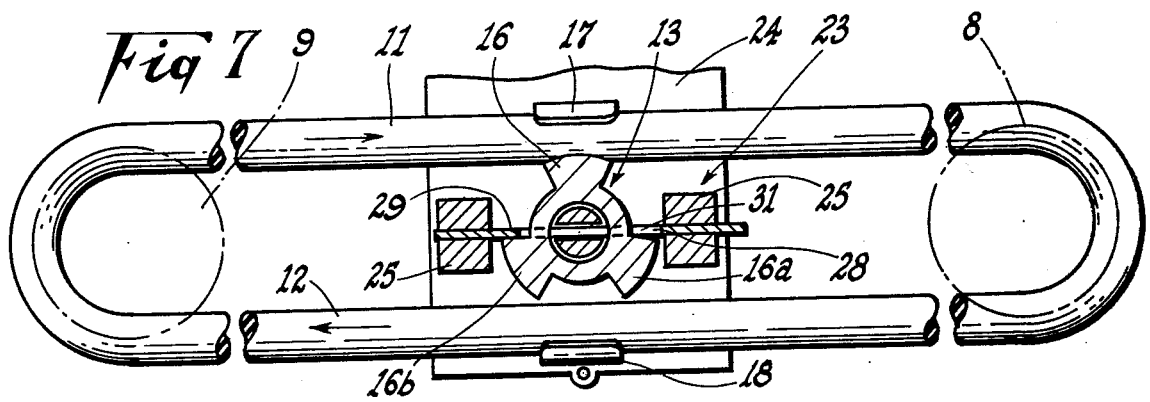
FIG. 7 is a view similar to FIG. 4 but showing an alternative arrangement of coupling and escapement.

FIG. 7 shows an alternative arrangement in which the coupling wheel 13 has only three lobes 16, and the escapement is in the form of a sliding plate 23 having a single opening 28 through which the wheel 13 projects. The escapement plate 23 slides in slots provided in the pillars 25, and extends substantially radially of the wheel 13. As shown, when the lobe 16 is operative by virtue of its engagement with the belt run 11, the trailing lobe 16b prevents inadvertant rotation of the wheel 13 by engaging with a side surface 29 of the plate 23. The opening 28 is large enough to permit change-over movement of the wheel 13 as previously described, and after the change-over, lobe 16a is operative and lobe 16 acts as the retaining lobe because of the change of position of plate 23 which is such that lobe 16 is engageable with side surface 31 of the plate 23.

Figure 8:
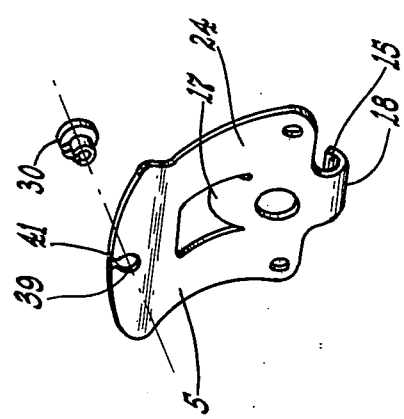
FIG. 8 is a perspective view of an alternative form of the yarn guide mounting plate as shown in FIGS. 1 to 3.

FIG. 8 shows an alternative embodiment of the mounting plate 24, in which there is no separate plate 23 as previously described, but the backing surface portions 17 and 18 are formed integral with the plate 24, which can be a metal pressing. The yarn guide 5 is also shown integral with the plate 24, and if desired the actual guide ring may be defined by a ceramic or other guide sleeve 30 attached to the plate 24.

As previously described, the carriage reversing means includes two stops 21 and 22 located at respective ends of the carriage path of movement. Each stop 21 and 22 can take any of several forms, such as a spring influenced or resilient striker member, and in the preferred form shown, each striker comprises a resilient arm 20 arranged in the path of movement of the carriage 2 so as to engage the adjacent end of the escapement sleeve 23. The arm 20 may be composed of spring steel, in which case the arm face which engages the escapement sleeve 23 may be coated with a noise dampening material such as polyurethane. Quite obviously other materials may be used for the arm 20, and also for the facing material if required.

According to an alternative stop arrangement which is not shown in the drawings, the striker 20 may comprise a member slidably mounted for movement generally in the direction of movement of the carriage 2, and being resiliently urged towards the carriage 2 by a coil spring or other means. The striker member can be composed of a plastics material or other material, which will aid in obtaining relatively silent operation of the mechanism. If desired, the slidable striker member can be omitted, and the coil spring itself can be used as the striker.

Any suitable means may be employed for adjusting the stop position. In the arrangement shown in FIG. 1 for example, each striker arm 20 is carried by a respective mounting block 32 slidably mounted on a rod 33 arranged parallel to the guide bar 3. Adjustment of the stop position can be effected through any suitable means such as a clamp screw 34 carried by each block and being engageable with the rod 33.

In another arrangement which is not shown, stop adjustment may be achieved through a rack and pinion assembly. A separate rack may be formed on or connected to each mounting block 32, and each may be driven by a separate pinion. Alternatively, a single pinion may be arranged to drive both racks, and that may be achieved by having one rack formed on one mounting block 32 and the other rack connected to the other mounting block through a connecting bar and located adjacent the first mentioned mounting block. The pinion is interposed between and drivingly engages with each rack, so that rotation of the pinion causes simultaneous movement of the two racks and consequently their respective mounting blocks 32. Thus, rotation of the pinion in one direction causes the mounting blocks to be drawn close together, and rotation in the opposite direction causes the mounting blocks to be moved further apart.

Turning now to FIG. 1, which shows the invention when applied to yarn winding, the traversing mechanism is arranged so that the carriage 2 moves substantially parallel to the axis of the bobbin 35 which constitutes the core of the package 36 to be formed. The package 36 is rotated by frictional engagement with the drive roller 6 as is well known in the art, and yarn 37 is fed to the package 36 through the intermediary of the traversing mechanism, from a hank or other yarn supply (not shown). The traversing mechanism functions to lay the yarn 37 back and forth across the length of the package 36 and for that purpose has the yarn guide 5 associated therewith, which is engaged by the yarn 37 and which directs the lay of the yarn 37 onto the package 36.

The yarn guide 5 can take any form, but in the arrangement shown it comprises an arm 38 projecting upwardly from the carriage 2 and towards the package 36. A guide ring 39 is formed at the terminal end portion of the arm 38 and has lateral opening 41 to permit access of the yarn 37. Such a guide arrangement is well known and it is also well known to position the guide ring 39 close to the nip between the package 36 and the drive roller 6. Furthermore, it is generally necessary to provide a second or outer yarn guide (not shown) between the hank and the carriage 2 and from which the yarn 37 is appropriately directed. The outer yarn guide is stationary, at least in the sense that it does not traverse the package 36.

In some yarn winding operations it is desirable that the carriage traversing speed is variable so as to permit changes in the lay helix on the package 36. In the traversing mechanism so far described, that may be achieved by means of an adjustable drive pulley 8 (see FIG. 9). That adjustment is preferably effected by varying the spacing between side plates 42 and 43 of the pulley which define a belt engaging groove 44 having sloping side surfaces. Consequently, as the plate spacing is varied, so is the effective diameter of the pulley 8, which is the diameter at which the drive belt 7 is drivably engaged. The pulley adjustment can be effected through a push rod 45 secured to the outer side plate 42 and slidable axially relative to the other plate 43, and any suitable means may be employed to control the axial position of the rod 45. In the form shown, the push rod 45 may extend axially through the drive roller 6 of the winding machine.

FIGS. 10 to 13 show an example application of the invention to a grinding machine. As a matter of convenience, parts of the traversing mechanism shown in these figures which are equivalent to parts previously described, will be given like reference numerals except that they will be in the series 100 to 199.

Basically, the grinding machine shown comprises a main body 151 which supports a reciprocatable work table 152 in a known manner. A grinding wheel 153 is located above the table 152, and a workpiece 154 can be secured to the table 152 by any suitable means such as a magnetic clamp 155, so as to be interposed between the table 152 and the wheel 153. Traversing movement of the table 152, is achieved through mechanism according to the invention and which is similar in many respects to that already described.

The carriage 102 of the mechanism is shown secured to the underneath of the table 152 through screws 156 or other suitable means, but it may be integral with the table 152. The drive belt 107 is driven by a pulley 108 and is arranged round an idler pulley 109, both of which pulleys are attached to the machine body 151 so as to be held against movement with the table 152. The stops 121 and 122 are adjustably mounted on the machine body 151, and the striker of each stop comprises a spring finger 120.

In the particular arrangement shown, the escapement is formed by a plate 123 slidably mounted on the carriage body 104 and having two end walls 156 and 157. Each end wall 156 and 157 has an abutment section 159 and 161 respectively formed thereon so as to project from one end of the wall, which end is a different end in each case. The spindle 162 of the wheel 113 passes through an elongate opening 163 of the plate 123, and that opening is dimensioned to permit the desired release movement of the plate 123. Two upstanding side walls 117 and 118 are formed along respective opposite sides of the carriage body 104, and respectively define the backing surfaces 114 and 115.

FIG. 11 is equivalent to FIG. 4 in that it shows the carriage 102 being driven to the right hand side of the page because the belt run 111 is clamped between the backing surface 114 and the lobe 116 of the wheel 113. The abutment 161 is arranged in the path of the trailing lobe 116b and thereby prevents inadvertant movement of the wheel 113 from its operative position. When the stop 121 eventually engages the end wall 156, the escapement plate 123 is caused to move to the left of the page in the manner previously described in relation to FIG. 5, and the wheel 113 is able to turn so that the lobe 116a is engaged with the belt run 112. FIG. 12 shows the wheel 113 after completion of the change-over in which the run 112 is clamped between the wheel 113 and the backing surface 115, and abutment 159 is positioned to prevent inadvertant movement of the wheel 113 from the new operative position.

When applied to a grinding machine as described, the traversing mechanism of the invention provides a relatively simple means for achieving reciprocating movement and automatic reversal of the work table 152. Other advantages of the mechanism as previously described also arise in this particular application.

As previously mentioned, the carriage stops can be solid rather than resilient, in which case, the resilient stop engaging means could be provided on the carriage body, or the escapement, which ever strikes the stop. Furthermore, the reference to "belt" throughout the specification and claims is to be understood as embracing all endless drive elements including chains, and the engagement with the coupling wheel can be positive rather than frictional.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A traversing mechanism including: a carriage; guide means slidably supporting said carriage for movement along a predetermined path; drive means including an endless belt arranged so that each of two runs of the belt are located on opposite sides respectively of the carriage and extend generally parallel to said path, and power means operatively connected to said belt to cause rotation thereof in one direction; a drive coupling mounted on said carriage for movement therewith and being operative to engage either one of said belt runs so as to lock said carriage thereto for movement with that run, said coupling including a single rotatable element having a plurality of radially projecting lobes arranged so that in one rotational position of said element one of said lobes engages one of said belt runs to effect said lock, and in another rotational position of said element another of said lobes engages the other of said belt runs to effect said lock, said lobe arrangement being such that only one of said belt runs is locked to said carriage in any one of said rotational positions of said coupling element; an escapement slidably mounted on said carriage for movement independent of the movement of said coupling element between two operative positions, in each of which said escapement prevents rotation of the coupling element in the direction in which it is influenced by the particular belt run with which it engages; and stop means located in the path of travel of said carriage at each of two positions spaced apart along that path, each being operative to cause movement of said escapement from one said operative position to another as said carriage approaches the respective stop means, and to thereafter present a barrier to further travel of said carriage towards that stop means; said escapement being operative during each said change of operative position to free said coupling element for limited rotation only in the direction of movement of the engaged belt run, which is sufficient to advance said coupling element from one said rotational position to another; whereby as said stop means presents a barrier to said carriage, continuing movement of the belt run locked to said carriage causes said coupling element to rotate in the direction of said belt run movement to adopt a rotational position in which a said lobe thereof engages the other said belt run so that said carriage is moved in the direction opposite to said one direction, and movement of said coupling element beyond that new rotational position is prevented by said escapement until there is a further change of the escapement operative position.

2. Traversing mechanism according to claim 1, wherein said drive coupling further includes a pair of backing surfaces, each of which is located on the outside of a respective said belt run so that section of that run is interposed between it and said coupling element, whereby each said belt run is adapted to have a section thereof clamped between said rotatable element and a respective said backing surface.

3. Traversing mechanism according to claim 1, wherein each said stop means is resilient and is resiliently distorted during transfer of said locking engagement from one said belt run to the other.

4. Traversing mechanism according to claim 3, wherein the resilience of each said stop means in predetermined so that the stop means functions to prevent said carriage from moving further towards it at substantially the same time as said coupling element adopts a new said rotational position.

5. A traversing mechanism as defined in claim 1, and a yarn guide is secured to said carriage for movement therewith.

6. A traversing mechanism as defined in claim 1, a reciprocatable work support table secured to said mechanism carriage for movement therewith, said work support table being slidably mounted on a body of said machine, and a grinding wheel positioned to be engageable with a workpiece carried by said work support table.

* * * * *